United States Patent [19]
Matsubara et al.

[11] Patent Number: 5,926,801
[45] Date of Patent: *Jul. 20, 1999

[54] ELECTRONIC SECURITY/STOCK TRADING SYSTEM WITH VOICE SYNTHESIS RESPONSE FOR INDICATION OF TRANSACTION STATUS

[75] Inventors: Hitoshi Matsubara, Kawasaki; Shuichiro Abe; Yasuhide Yamamoto, both of Tokyo, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/626,980

[22] Filed: Apr. 3, 1996

Related U.S. Application Data

[63] Continuation of application No. 08/214,749, Mar. 18, 1994, abandoned.

[30] Foreign Application Priority Data

Apr. 16, 1993 [JP] Japan .................................. 5-089741

[51] Int. Cl.⁶ ...................................................... G06F 17/60
[52] U.S. Cl. ............................................................. 705/37
[58] Field of Search .......................... 705/35, 37, 1, 705/26

[56] References Cited

U.S. PATENT DOCUMENTS

| | | |
|---|---|---|
| 3,581,072 | 5/1971 | Nymeyer . |
| 4,554,418 | 11/1985 | Toy .............................................. 379/88 |
| 4,674,044 | 6/1987 | Kalmus et al. .......................... 364/408 |
| 4,980,826 | 12/1990 | Wagner ................................... 364/408 |
| 5,077,665 | 12/1991 | Silverman et al. ...................... 364/408 |
| 5,101,353 | 3/1992 | Lupien et al. ........................... 364/408 |

FOREIGN PATENT DOCUMENTS 63-56766  3/1988  Japan .

*Primary Examiner*—Robert A. Weinhardt
*Attorney, Agent, or Firm*—Staas & Halsey

[57] ABSTRACT

An electronic dealing system which electronically performs matching processing between the information on transaction orders placed by order side customers and information on transaction orders placed by hit side customers so as to establish transactions, which system sets a margin relative to a last trade price, calculates a decision price from the last trade price and the set margin when the last trade price has been determined, detects if a situation has occurred which is disadvantageous to the customer under current market conditions with respect to the price of the offered order by judging the relative size of the price of the order placed by the order side customer and the calculated decision price, and outputs an alarm when it detects the occurrence of a disadvantageous situation, whereby the load on the customer is lightened and the customer can trade with more certainty.

16 Claims, 18 Drawing Sheets

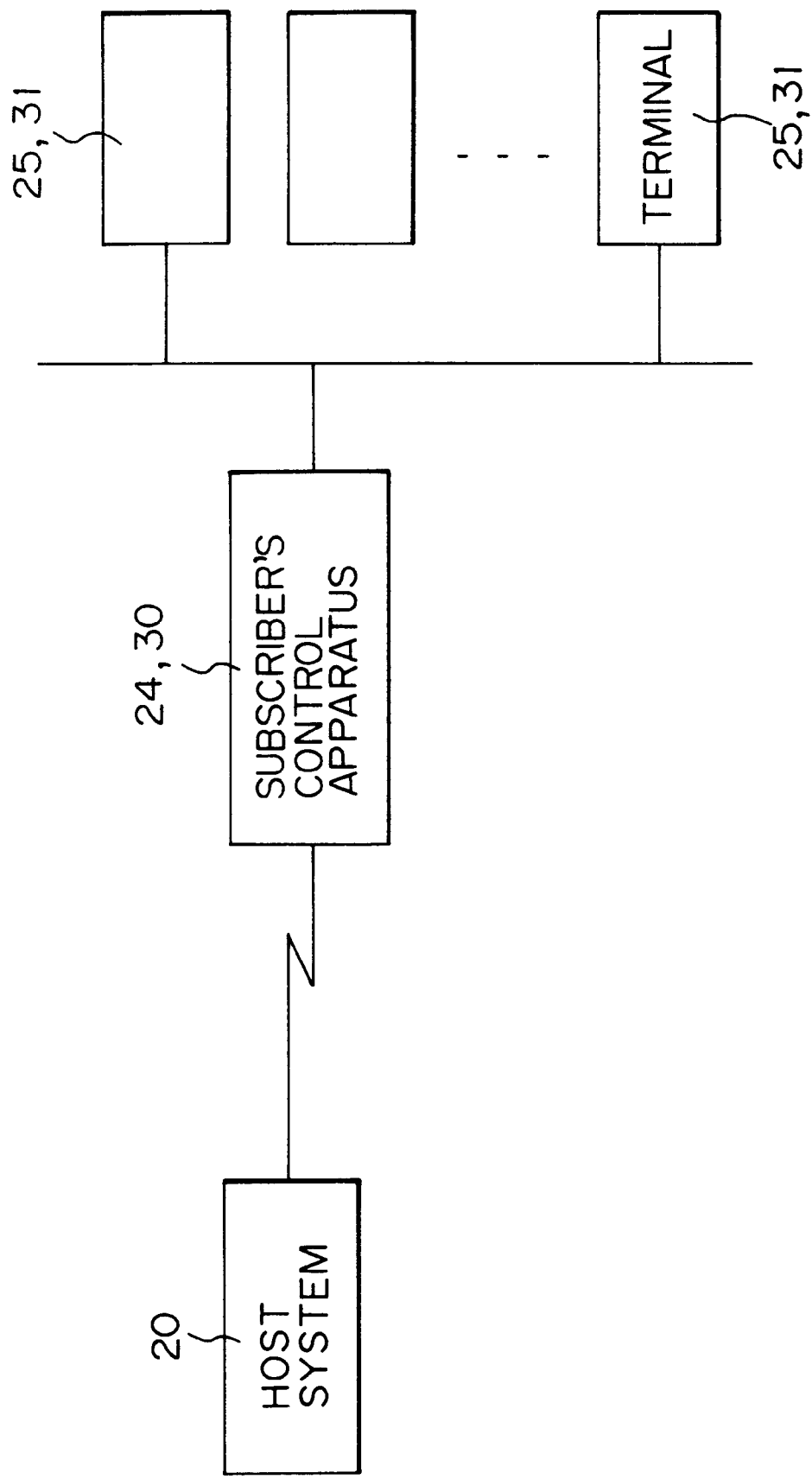

Fig. 7

AUDIO SETUP

| MARKET | USD/JPY ↓ |
| AUDIO OUTPUT | ☐ OFF  ☒ ON |

| ☐ BEST RATE ANNOUNCEMENT | OFF ↓ | 30 SECOnds |
| ☐ LAST TRADE ANNOUNCEMENT | ☐ OFF  ☒ ON |
| ☐ ALARM | ☐ OFF  ☒ ON |
| ☐ CALL LEVEL | OFF ↓ |
| | BID ☐  OFFER ☐ |
| ☐ RESULTS ANNOUNCE | OFF ↓ |
| ☐ LANGUAGE | TYPE-1 ↓ |

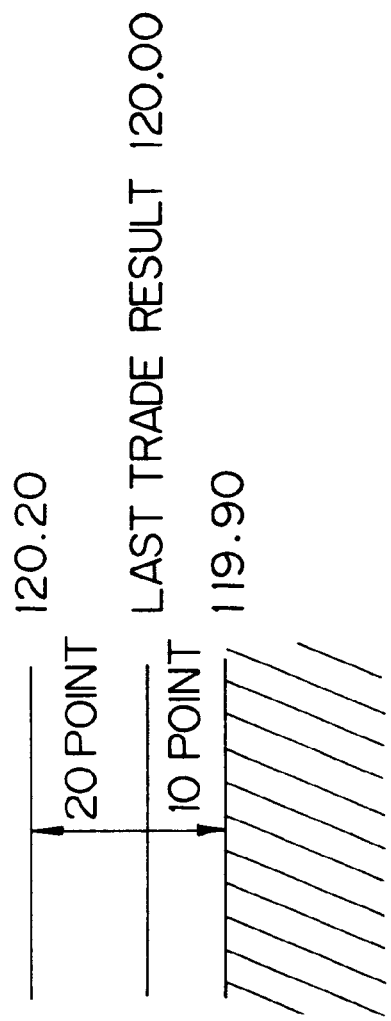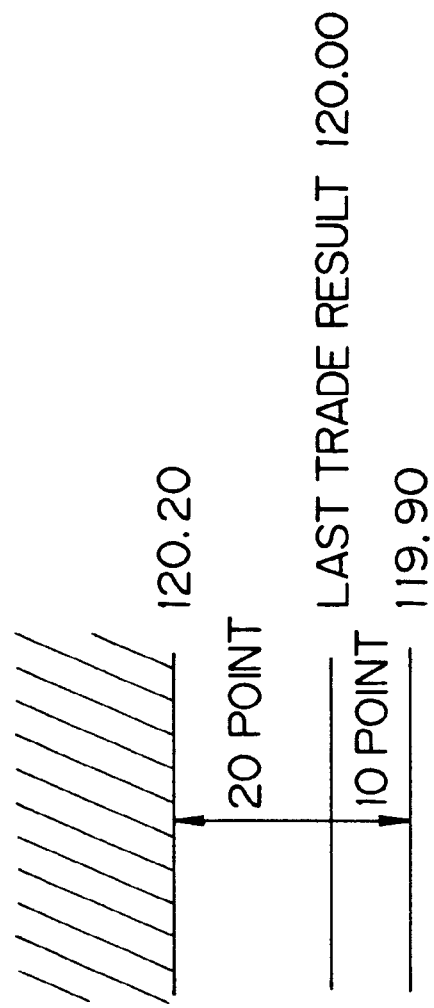
Fig. 10A
Fig. 10B

ELECTRONIC SECURITY/STOCK TRADING SYSTEM WITH VOICE SYNTHESIS RESPONSE FOR INDICATION OF TRANSACTION STATUS

This application is a continuation of application Ser. No. 08/214,749, filed Mar. 18, 1994, now abandoned.

BACKGROUND OF THE INVENTION

1. Field of the Invention

The present invention relates to an electronic dealing system which electronically performs matching processing of information on transaction orders placed by order side customers and information on transaction orders placed by hit side customers so as to establish transactions and, more particularly, relates to an electronic dealing system which ensures a greater certainty of transactions for the customers.

In electronic dealing systems which handle foreign exchange etc., matching processing is performed electronically between information on transaction orders placed by the order side customers and information on transaction orders placed by the hit side customers so as to establish transactions. To make such an electronic dealing system practical, it is necessary to construct it so as to ensure a greater certainty of transactions for the customers.

2. Description of the Related Art

The electronic dealing system to which the present invention is applied has the general configuration shown in FIG. 16.

In such an electronic dealing system, there is the problem that the order side customer has to continually monitor on the display screen the state the order he placed on the market, so the customer has an extra burden and sometimes will overlook the occurrence of situations advantageous for transactions or the occurrence of situations disadvantageous for transactions.

SUMMARY OF THE INVENTION

The present invention was made in consideration of the above circumstances and has as its object the provision of a new electronic dealing system which electronically performs matching processing of information on transaction orders placed by order side customers and information on transaction orders placed by hit side customers so as to establish transactions and which both reduces the load of the customers and also ensures a greater certainty of transactions for the customers.

To attain the above object, the present invention provides an electronic dealing system which includes setting means for setting a margin (fluctuation price) relative to a last trade price, calculating means for calculating a decision price from the Last trade price and the set margin when the last trade price has been determined, detecting means for detecting if a situation has occurred which is disadvantageous to the customer under current market conditions with respect to the price of the order by judging the relative size of the price of the order placed by the order side customer and the calculated decision price, and alarm means for outputting an audio alarm when the detecting means detects the occurrence of a disadvantageous situation.

BRIEF DESCRIPTION OF THE DRAWINGS

The above object and features of the present invention will be more apparent from the following description of the preferred embodiments with reference to the accompanying drawings, wherein:

FIG. 3 is a view for explaining the hierarchical structure of an electronic dealing system;

FIG. 7 is a view of an example of an interactive type screen provided in the subscriber control apparatus;

FIGS. 10A and 10B are views for explaining a buzzer sounding zone;

DESCRIPTION OF THE PREFERRED EMBODIMENTS

Before describing the embodiments of the present invention, the related art and the problems therein will be first described with reference to the accompanying drawings.

Figure 16:
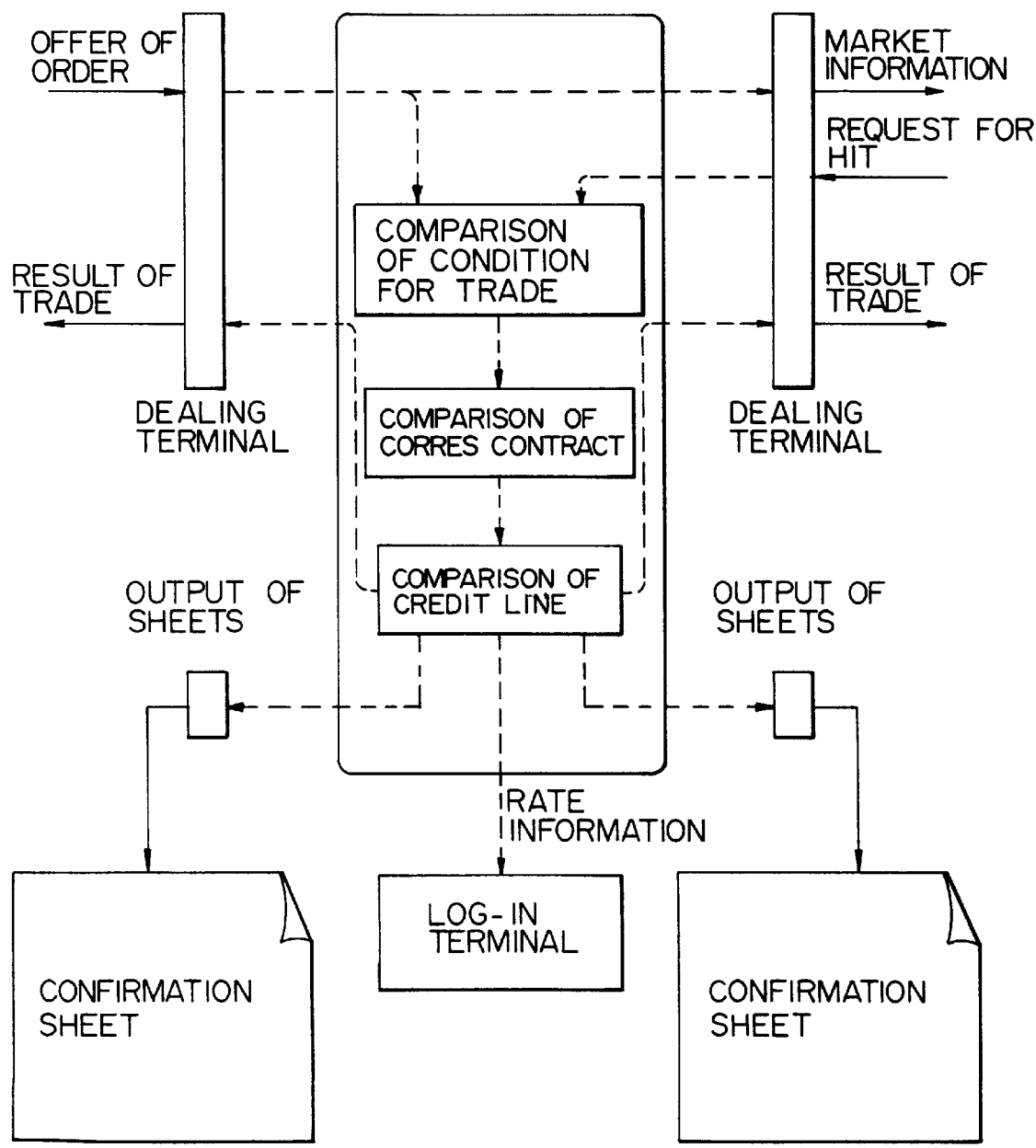
FIG. 16 is a view for generally explaining the electronic dealing system to which the present invention is applied.

First, referring to FIG. 16, in an electronic dealing system to which the present invention is applied, when an order side customer places a transaction order through a dealing terminal, the market information (rate information) is notified to hit side customers through the dealing terminal. When in response to the notification, there is a request for a hit of the transaction order from a hit side customer, first electronic matching processing is executed so as to compare the terms of the transaction of the placed order and the terms of the transaction of the hit request.

When it is decided by this comparison that the respective terms of the hit and the placed order transactions (price of transaction and amount of transaction) match, the correspondent agreements are compared. That is, it is checked if each of the parties concluding the agreement is able to do business. If it is decided by this comparison that each of the parties able to do business, the credit lines are then compared. That is, it is checked if the amount of the transaction is inside the credit lines.

If it is decided as a result of this comparison that the amount is inside the credit lines, the transaction is established and confirmation sheets of the transaction are output to the order side customer and the hit side customer and the information on the changed market rate is displayed on the logged-in terminals.

If this configuration is adopted, however and as already mentioned, there is the problem that the order side customer had to continually monitor, on the display screen, the state of the order he had placed on the market, so that customer had an extra burden and sometimes would overlook the occurrence of situations advantageous for transactions or the occurrence of situations disadvantageous for them.

The present invention, which solves this problem, will now be explained in further detail below.

Figure 1:
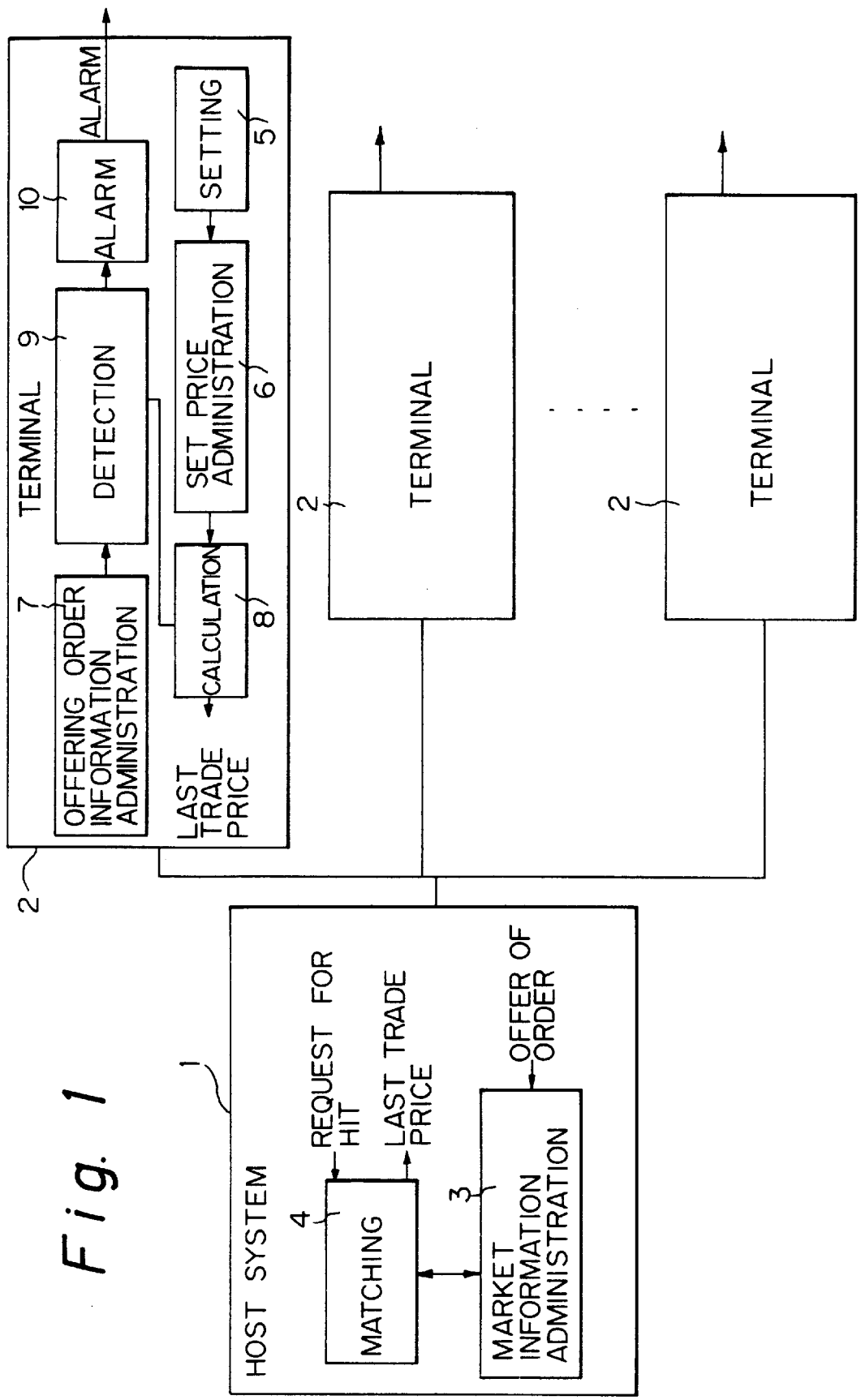
FIG. 1 is a view of the overall arrangement of the present invention.

FIG. 1 illustrates the basic configuration of the present invention.

In the figure, 1 is a host system constituting part of the electronic dealing system to which the present invention is applied. This is designed to perform matching processing between the information on transaction orders placed by order side customers and information on transaction orders placed by hit side customers so as to establish transactions between the two parties. Reference numeral 2 identifies a plurality of terminals also constituting part of the electronic dealing system to which the present invention is applied. These terminals 2 execute interactive processing with the customers.

The host system 1 is provided with a market information administering means 3 for administering orders placed by order side customers and a matching means 4 for executing matching processing between an order placed by an order side customer and a request for hit placed by a hit side customer.

On the other hand, each of the terminals 2 is provided with a setting means 5 for setting a margin relative to a last trade price, a set price administering means for administering the margin set by the setting means 5, an order information administering means 7 for administering the information on orders placed by an order side customer operating that terminal, a calculating means 8 for calculating a decision price from the last trade price and the set margin when the last trade price has been determined, a detecting means for detecting if a situation has occurred which is advantageous to the order placed by the order side customer under current market conditions or a situation has occurred which is disadvantageous to the same, and an alarm means 10 for outputting an audio alarm when the detecting means 9 detects the occurrence of an advantageous or disadvantageous situation.

In the present invention, when a matching means 4 in the host system 1 determines the last trade price, the calculating means 8 in the terminal 2 subtracts the bid (buy) margin set by the setting means 5 from the last trade price so as to calculate the bid decision price and also adds the last trade price and the offer (sell) margin set by the setting means 5 to calculate the offer decision price.

If the decision price is calculated in this way, the detecting means 9 detects if a situation has occurred which is disadvantageous under the current market conditions for the order price by deciding the relative amount (which is higher and which is lower) of the order price administered by the order information administering means 7 and the calculated decision price. That is, the detecting means 9 detects the occurrence of a disadvantageous situation when the bid order price is lower than the bid decision price and a disadvantageous situation when the offer order price is higher than the offer decision price.

If it is detected by this detection processing that a disadvantageous situation has occurred, the alarm means 10 issues an audio alarm, for example, a buzzer sound or synthesized speech, when the disadvantageous situation first occurs. Here, when both the occurrence of a situation disadvantageous to the bid order price and the occurrence of a situation disadvantageous to the offer order price are detected, the alarm means 10 preferably outputs a type of audio alarm enabling discrimination of these situations.

Alternatively, if the decision price is calculated in this way, the detecting means 9 may decide on the relative amount of the order price administered by the order information administering means 7 and the calculated decision price so as to detect if a situation has occurred which is advantageous to the order price under the current market conditions. That is, it may detect the occurrence of an advantageous situation where the bid order price is higher than the bid decision price or an advantageous situation where the offer order price is lower than the offer decision price.

If the occurrence of such an advantageous situation is detected in accordance with this detection processing, the alarm means 10 issues an audio alarm, for example a buzzer sound or synthesized speech, when for example the advantageous situation first occurs. Here, when both the occurrence of a situation advantageous to the bid order price and the occurrence of a situation advantageous to the sell order price are detected, the alarm means 10 preferably outputs a type of audio alarm enabling discrimination of which situation it is.

In this way, according to the present invention, it becomes possible in the electronic dealing system for the order side customer to determine the state of the order he placed on the market in accordance with the information provided by the audio alarm. Therefore, there is no longer a need to continuously watch the display screen, so the load on the customer is lightened and also there is no problem with the customer overlooking the occurrence of advantageous situations or the occurrence of disadvantageous situations.

Below, the present invention will be explained in more detail in accordance with embodiments showing the case of application of the invention to an electronic dealing system handling foreign exchange.

Figure 2:
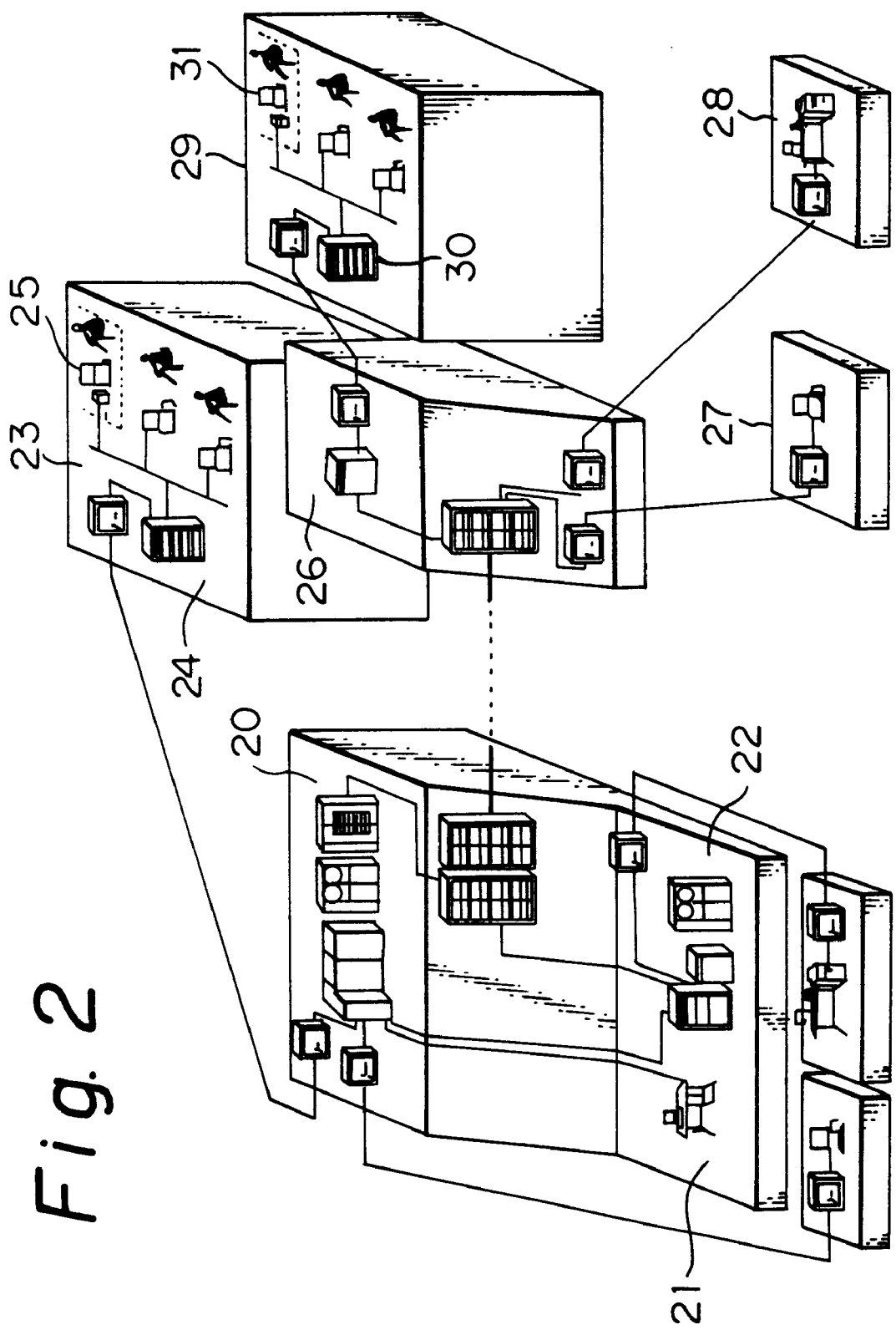
FIG. 2 is a view of an example of an electronic dealing system to which the present invention is applied.

FIG. 2 illustrates an example of the configuration of an electronic dealing system handling foreign exchange to which the present invention is applied.

In the figure, 20 is a host system, which manages information on requests for foreign exchange transactions and applies matching processing to this information so as to help establish such transactions. Reference numeral 21 is a supervisory system which is connected to the host system 20 and supervises the operation of the host system 20. Reference numeral 22 is a charging system which is connected to the host system 20 and processes service fees for established transactions etc. Reference numeral 23 is a customer system which is connected to the host system 20 and carries out interactive processing with the customer. Reference numeral 24 is a subscriber control apparatus which is provided in the customer system 23 and supports the terminals under the customer system 23. Reference numeral 25 is a terminal which is controlled by the subscriber control apparatus and serves as an interactive means with the customers.

Reference numeral 26 is a sub-system which is established overseas and supports the host system 20. Reference numeral 27 is a supervisory system which is connected to the sub-system 26 and supervises the state of operation of the host system 20 etc. Reference numeral 28 is a charging system which is connected to the sub-system 20 and processes service fees for established transactions etc. Reference numeral 29 is a customer system which is connected to the sub-system 26 and carries out interactive processing with the customers. Reference numeral 30 is a subscriber control apparatus which is provided in the customer system 29 and supports the terminals under the customer system 29. Reference numeral 31 is a terminal which is controlled by the subscriber control apparatus 30 and serves as an interactive means with the customers.

The electronic dealing system shown in FIG. 2 thus has a hierarchical structure such as that of FIG. 3.

The host system 20 helps to establish foreign exchange transactions by administering information on bid and offer orders placed by order side customers. This rate information is displayed on the display screens of the terminals 25 and 31 under control of the customer systems 23 and 29. These terminals 25 and 31 not only display this rate information, but also manage information on bid and offer orders placed by their own customers. They therefore also display the orders placed by their own customers on their display screens.

Figures 4A, 4B:
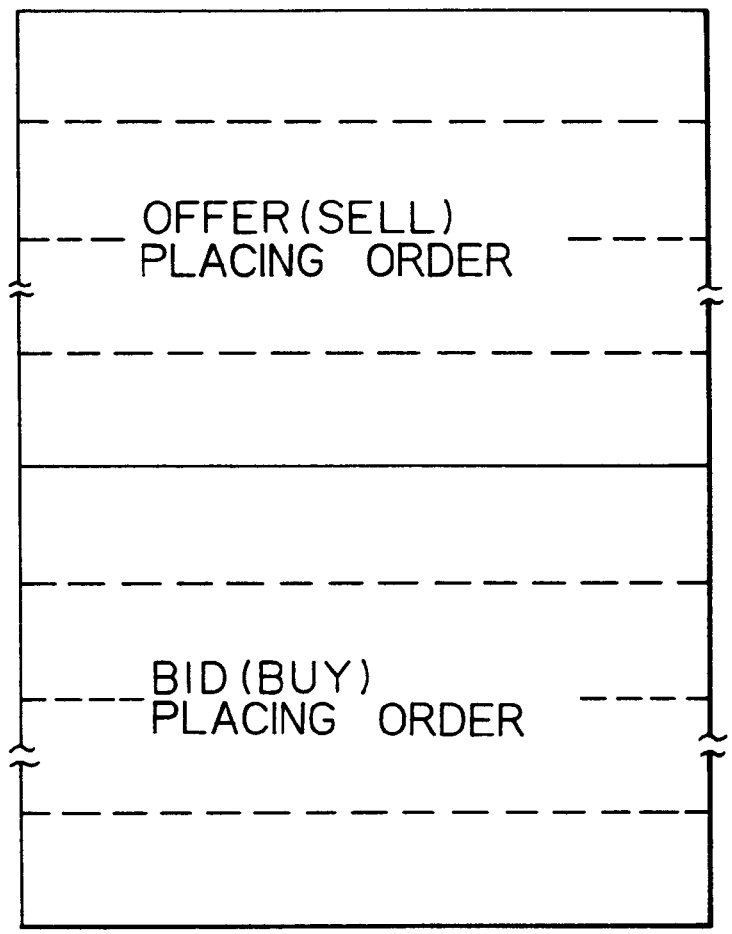
FIGS. 4A and 4B are views for explaining a home order table.

The information on bid and offer orders placed by one's own customers is managed by recording it in an order table which is split into bid orders and offer orders, as shown in FIG. 4A. The records in the table, as shown in FIG. 4B, include not only the price, but also a check flag, which is set to OFF at the time of a new recordal.

Figure 5:
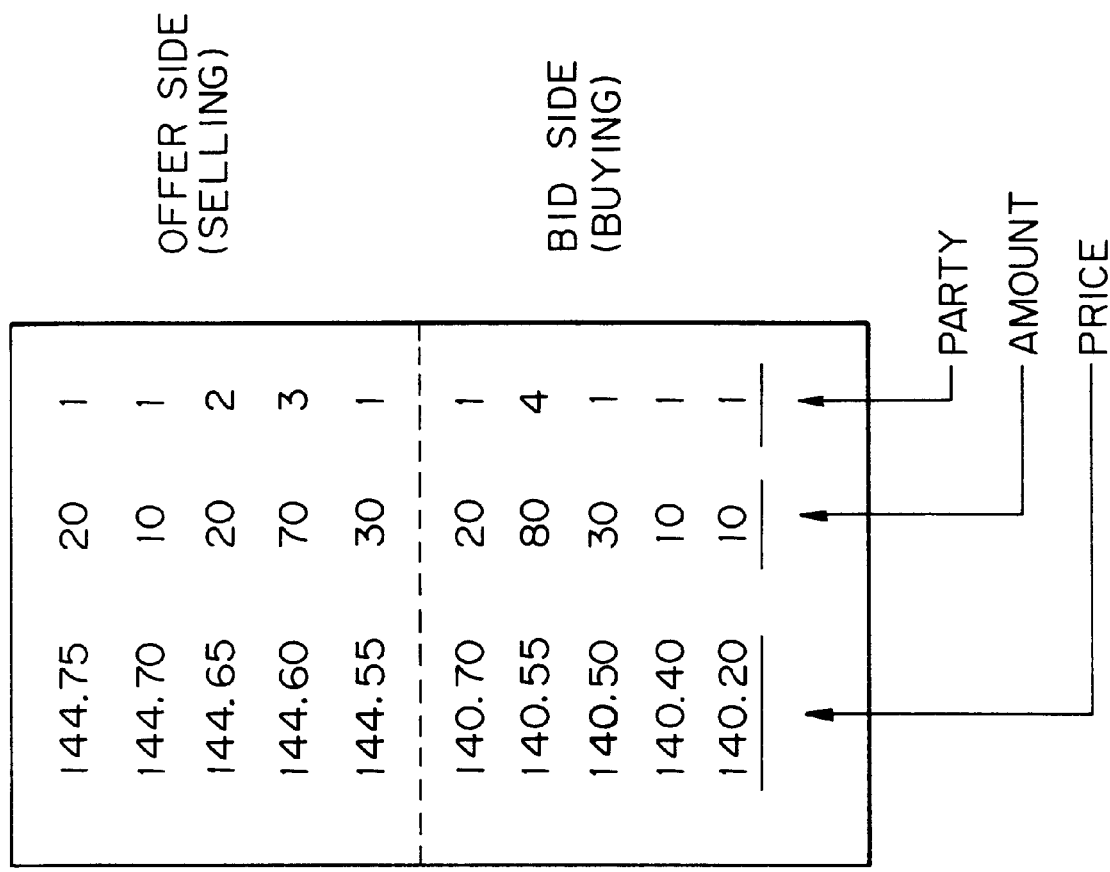
FIG. 5 is a view of an example of rate information displayed on a screen.

FIG. 5 illustrates an example of the display of rate information to the customers through logged-in terminals 25 and 31. Here, the "price" column in the figure shows the price which is offered, e.g., "U.S.$1=140.20 yen" and the "amount" column shows the amount of the transaction (one unit equaling U.S.$1 million). The "party" column shows the number of customers offering that price.

The rate information in the example shown has a row array structure comprised of five records for each of offers and bids. The offer side desires transactions at a high exchange price, while the bid side desires transactions at a low exchange price. The system combines these desired transactions and shows the offer side orders at the upper part of the display and the bid side orders at the lower part of the display. The records are displayed so that the further upward, the higher the order prices offered. Note that the best rate at the offer side is defined as the lowest order price, while the best rate at the bid side is defined as the highest offering order price.

This thus displayed rate information is successively updated as transactions are established in accordance with the matching processing performed by the host system 20. The updated rate information is transferred through the subscriber control apparatuses 24 and 30 to the terminals 25 and 31 every 2 seconds, for example. The data for the rate information may be transferred by directly transferring the updated rate information, but the method of transferring just information showing the difference of the updated rate information from the rate information of the previous cycle is preferred since it enables the amount of data transferred to be greatly reduced.

Figure 6:
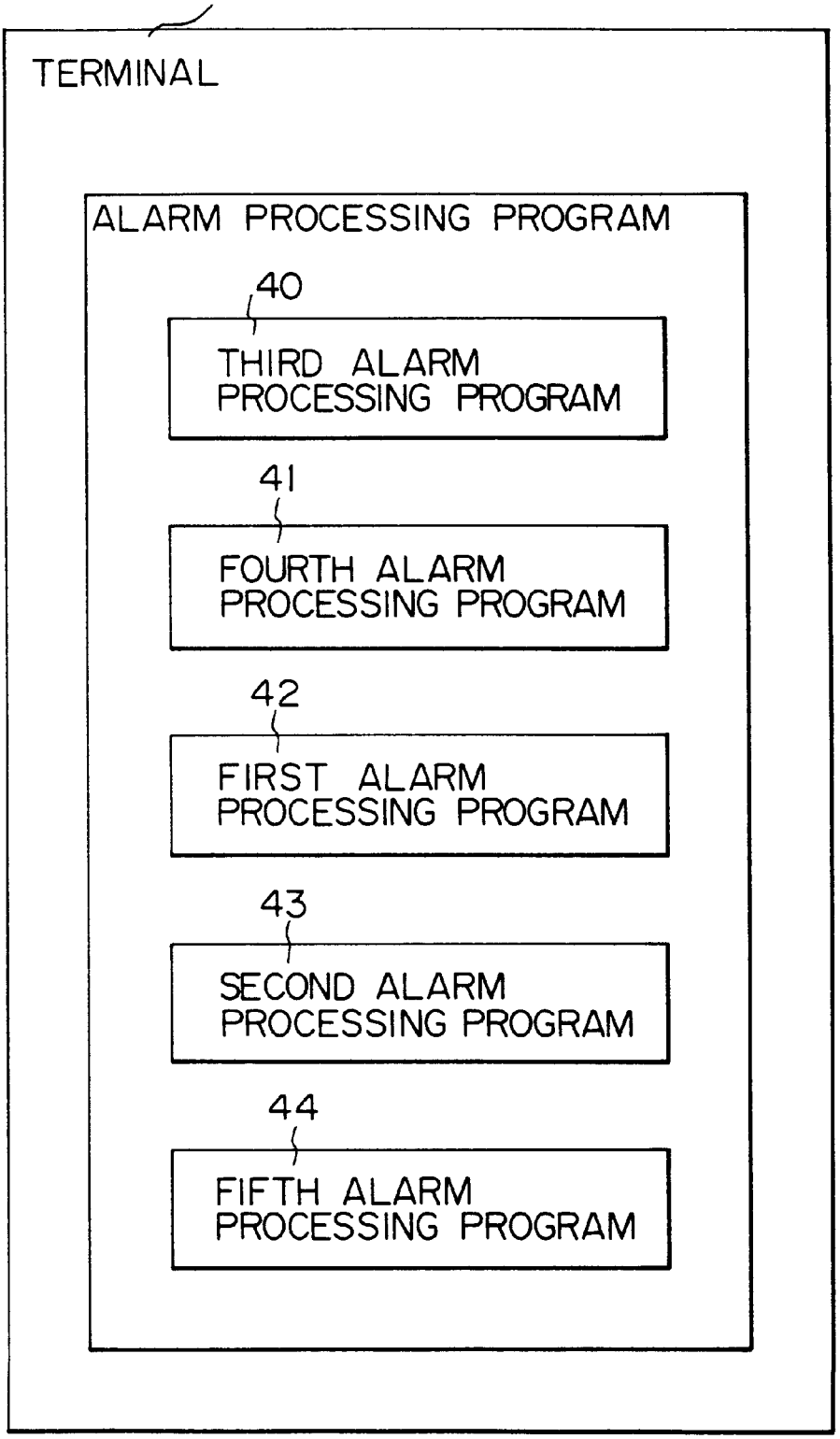
FIG. 6 is a view of an example of the construction of an alarm processing program.

FIG. 6 shows an example of the configuration of various types of alarm processing programs running in the terminals 25 and 31.

In the figure, 42 is a first alarm processing program, which operates to output alarm information with respect to orders becoming disadvantageous compared with predetermined conditions. Reference numeral 43 is a second alarm processing program which operates to output alarm information with respect to orders becoming advantageous compared with predetermined conditions. Reference numeral 40 is a third alarm processing program which operates to output alarm information when the best rate changes. Reference numeral 41 is a fourth alarm processing program which operates to output alarm information with respect to orders which are hit. Reference numeral 44 is a fifth alarm processing program which operates to output alarm information when the best rate becomes advantageous compared with the set absolute price.

Which among these alarm processing programs are activated is determined in accordance with interactive processing with the customer, in advance, in the terminals 25 and 31. The results are recorded in the subscriber control apparatuses 24 and 30. An example of the display screen used for this interactive processing is shown in FIG. 7.

That is, the terminals 25 and 31 display the screen shown in FIG. 7. One of the following is selected in the "CALL LEVEL" field in the screen: "BEST RATE CHANGE" when activating the third alarm processing program 40, "YOUR ORDER HIT" when activating the fourth alarm processing program 41, "YOUR ORDERS FAR" when activating the first alarm processing program 42, "YOUR ORDERS CLOSE" when activating the second alarm processing program 43, and "PRICE LEVEL REACH" when activating the fifth alarm processing program 44, thereby determining which among the alarm processing programs is to be activated. Note that it is also possible to adopt a construction in which a plurality of alarm processing programs can be activated at the same time.

Here, the "MARKET" field in the display screen shown in FIG. 7 is provided to enable the operator to designate the market name. The "AUDIO OUTPUT" field is provided to enable the operator to designate whether to use the audio output function of an expansion apparatus. The "BEST RATE ANNOUNCEMENT" field is provided to enable the operator to designate the timing of the audio output and the duration of the output when the best rate changes. The "LAST TRADE ANNOUNCEMENT" field is provided to enable the operator to designate whether to have audio output when the latest trade has occurred. The "ALARM" field is provided to enable the operator to designate if audio output is to be given when an input error occurs in the procedure for placing an offer. The "RESULTS ANNOUNCE" field is provided to enable the operator to designate the conditions of the audio output of the results of transactions. The "LANGUAGE" field is provided to enable the operator to designate the language of the synthesized speech.

Note that when the customer selects "YOUR ORDERS FAR" at the terminal so as to activate the first alarm processing program 42, it is then necessary to continue and input the offer/bid margin explained with reference to FIG. 1. Further, when the customer selects "YOUR ORDERS CLOSE" at the terminal so as to activate the second alarm processing program 43, it is also necessary to continue and input the offer/bid margin explained with reference to FIG. 1. Further, when the customer selects "PRICE LEVEL REACH" at the terminal so as to activate the fifth alarm processing program 44, it then necessary to continue and input the set absolute price (two kinds: offer and bid).

The thus set offer/bid margin and offer/bid set absolute price are downloaded into the internal table of the terminals 25 and 31 from the corresponding subscriber control apparatuses 24 and 30 when the terminals 25 and 31 are started up.

Figure 8A:
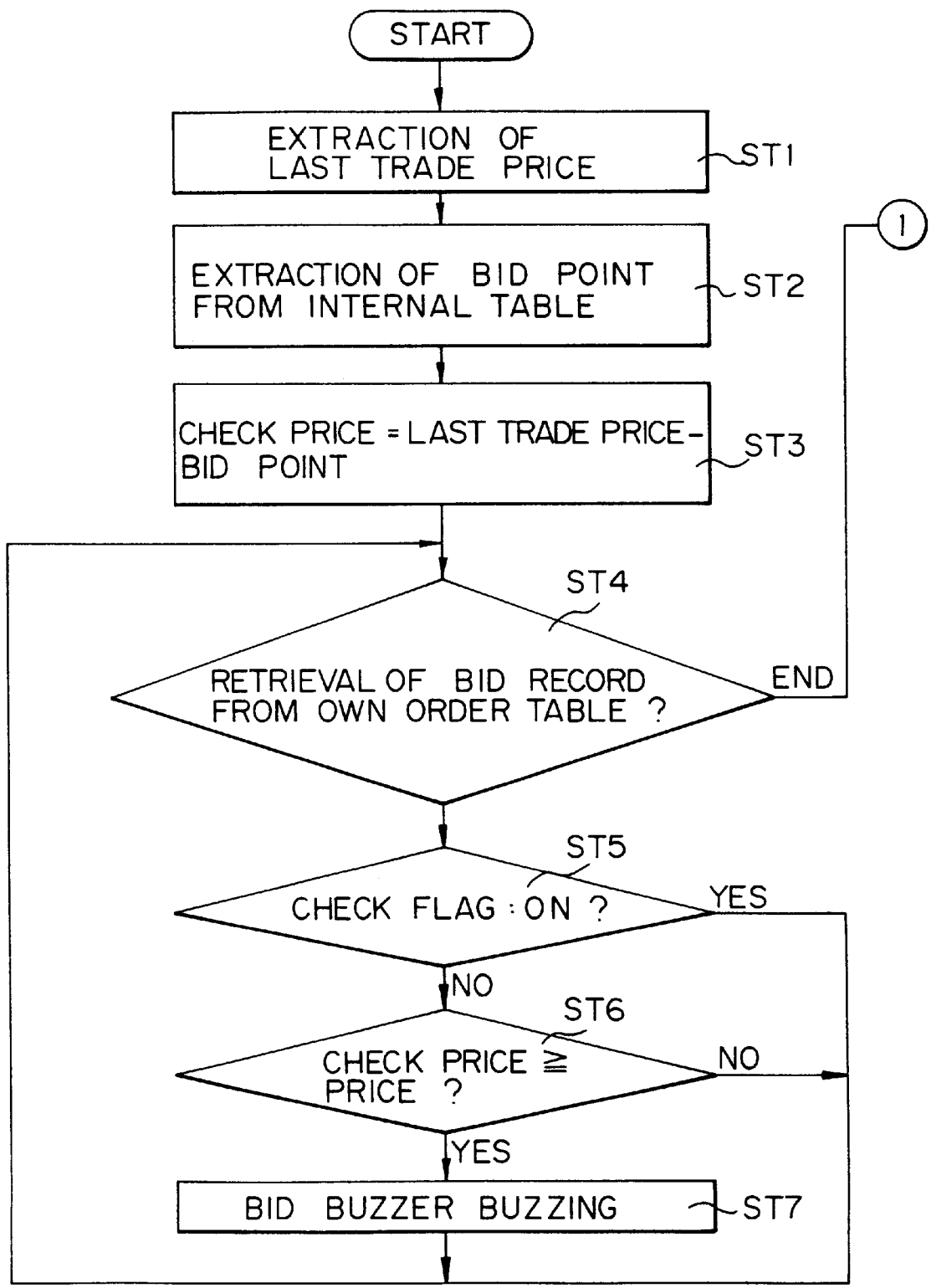
FIGS. 8A and 8B are flow charts of an example of a flow of processing executed by a first alarm processing program.
Figure 8B:
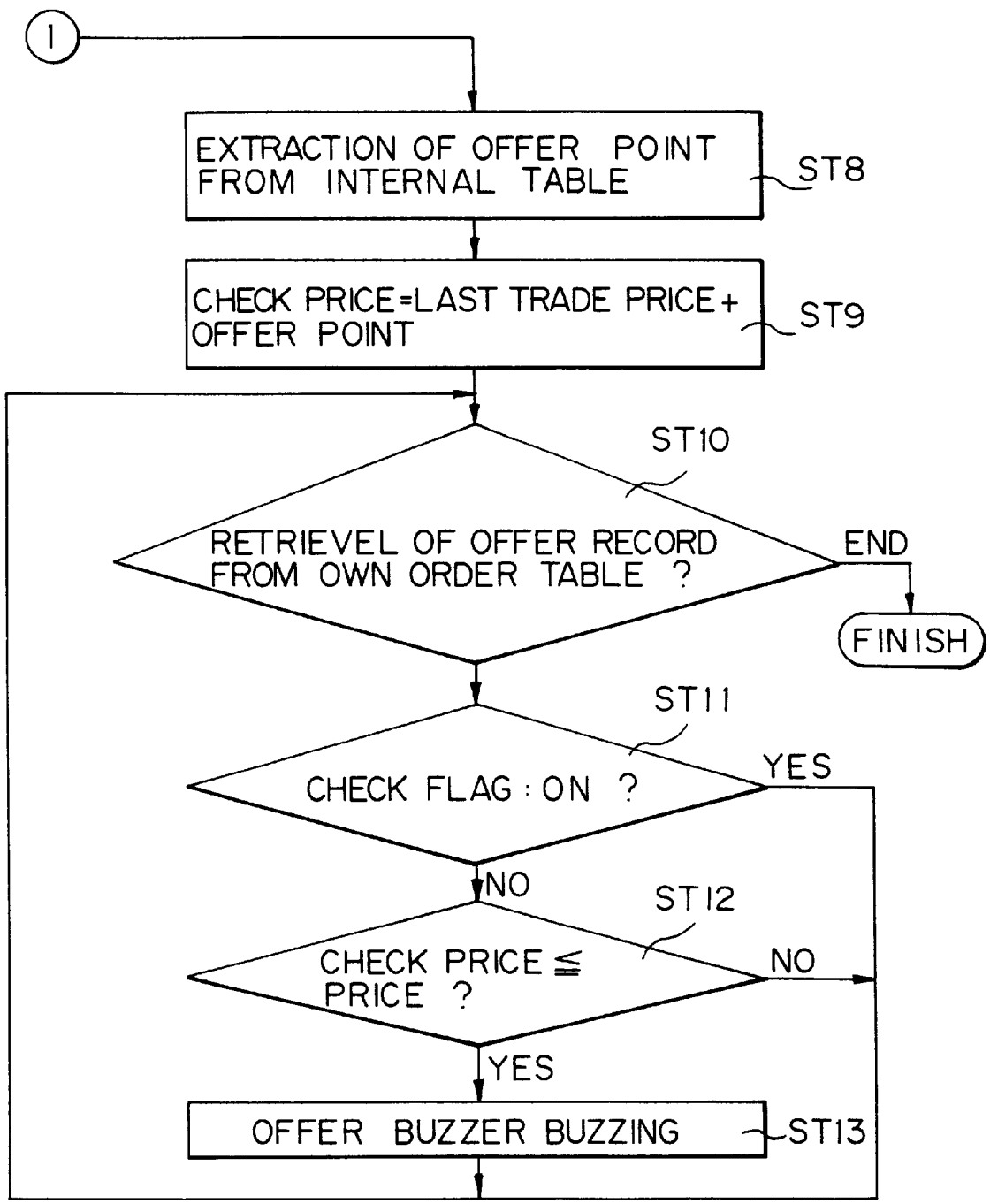
Figure 9A:
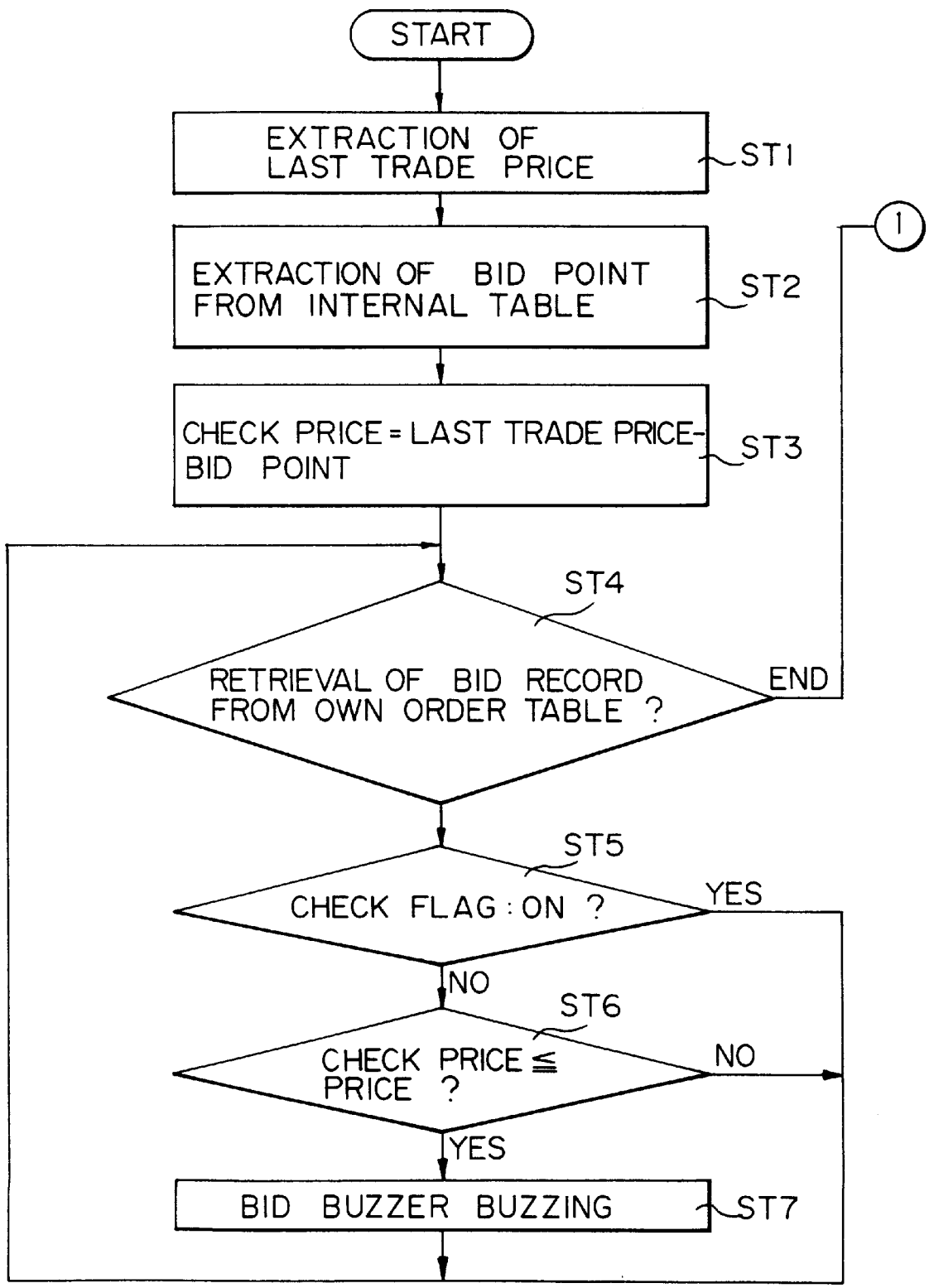
FIGS. 9A and 9B are flow charts of an example of a flow of processing executed by a second alarm processing program.
Figure 9B:
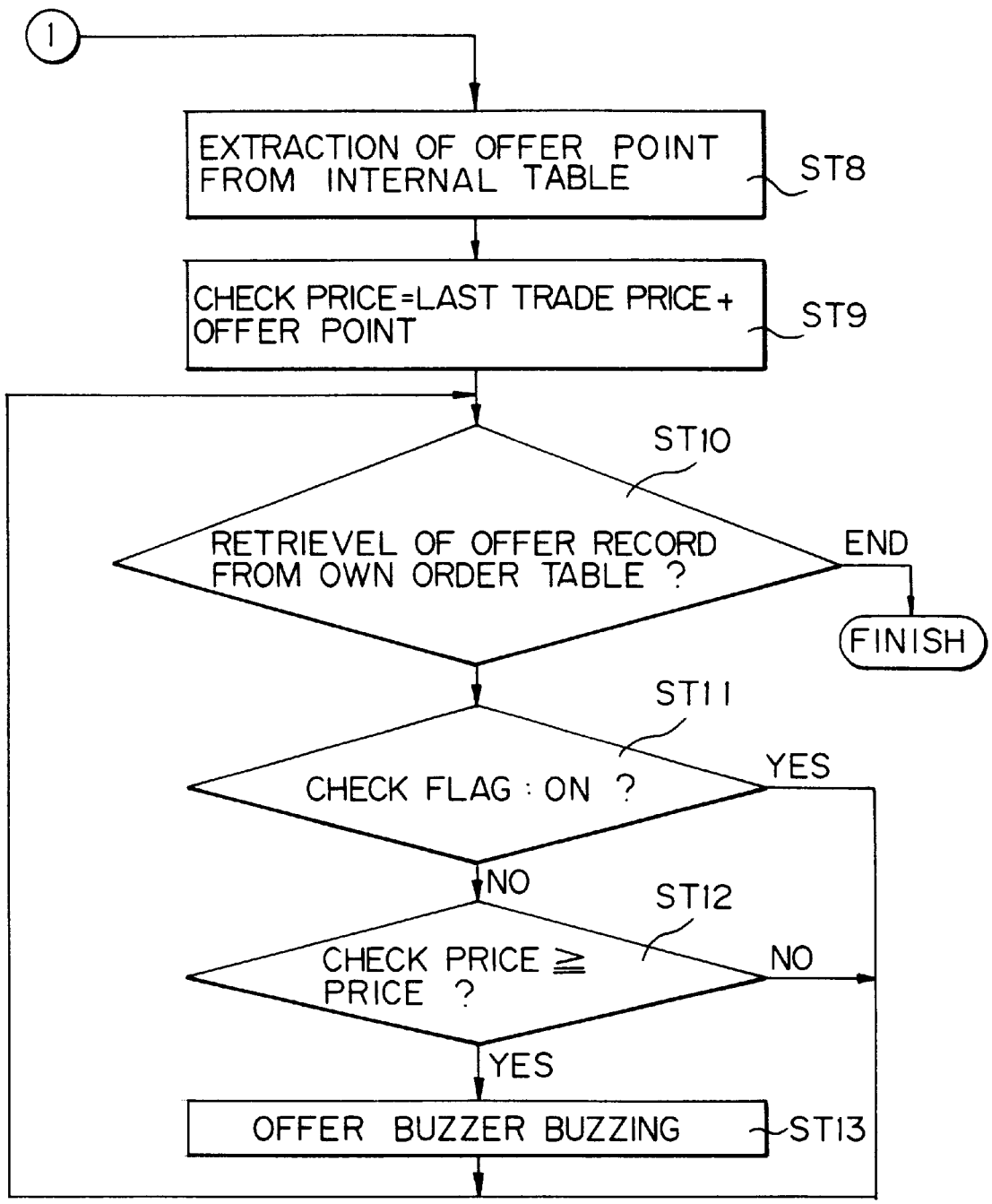

FIGS. 8A and 8B show an example of the flow of processing executed by the first alarm processing program 42. FIGS. 9A and 9B show an example of the flow of processing executed by the second alarm processing program 43. Next, a more detailed explanation will be given of the processing for alarm output executed by the first and second alarm processing programs 42 and 43.

When given rate information from the host system 20 at two second intervals, at step 1 (ST1), the first alarm processing program 42, as shown by the flow of processing of FIGS. 8A and 8B, extracts the last trade price included in the rate information. Next, at step 2 (ST2), it extracts the bid margin (bid point) downloaded in the internal table. Then, at step 3 (ST3), it subtracts from the last trade price extracted at step 1 the bid margin extracted at step 2 so as to calculate the bid check price.

Next, at step 4 (ST4), the program retrieves the record of the next bid order from its order table having the data structure shown in FIGS. 4A and 4B. When able to retrieve the record, it proceeds to step 5 (ST5), where it is judged if the check flag of the retrieved bid order is ON or OFF. When it is judged by this that the check flag is ON, as mentioned later, the audio alarm has already been output, so the routine returns to step 4 (ST4) to proceed to the processing for the next bid order.

On the other hand, when it is judged that the check flag is OFF, the routine proceeds to step 6 (ST6), where a comparison is made of the relative amount of the order price of the bid order retrieved at step 4 and the bid check price calculated at step 3. When it is judged by this comparison that the bid check price is equal to or larger than the bid order price, the routine proceeds to step 7 (ST7), where the bid buzzer is sounded to output the alarm. At this time, the flag is set ON and then the routine returns to step 4 to proceed to the processing of the next bid order. As opposed to this, when it is judged that the bid check price is smaller than the bid order price, the routine proceeds to the processing of the next bid order without sounding the bid buzzer.

In this way, the system successively takes out all the bid orders in its order table and sounds the bid buzzer just once for a bid order meeting the condition of the bid check price being greater than or equal to the bid order price.

On the other hand, when it is judged at step 4 that all the bid orders in the order table have finished being processed, the routine proceeds to step 8 (ST8), where the offer margin (offer point) downloaded in the internal table is extracted; then, the routine proceeds to step 9 (ST9), where the last trade price extracted at step 1 and the offer margin extracted at step 8 are added to calculate the offer check price.

Next, at step 10 (ST10), the record of the next offer order is retrieved from the order table. When the record can be retrieved, the routine proceeds to step 11 (ST11), where it is judged if the check flag of the offer order which is retrieved is ON or OFF. When it is judged by this that the check flag is ON, as mentioned later, the alarm has already been output, so the routine returns to step 10 to proceed to the processing of the next offer order.

On the other hand, when it is judged that the check flag is OFF, the routine proceeds to step 12 (ST12), where a comparison is made of the relative size of the order price of the offer order retrieved at step 10 and the offer check price calculated at step 9. When it is judged by this comparison that the condition is met of the offer check price being less than or equal to the offer order price, the routine proceeds to step 13 (ST13), where the offer buzzer is sounded to output the alarm information. At this time, the check flag is set ON, then the routine returns to step 10 (ST10) to proceed to the processing of the next offer order. As opposed to this, when it is judged that the condition is met, of the offer check price being larger than the offer order price, the routine returns to step 10 (ST10) to proceed to the processing of the next offer order without sounding the buzzer.

In this way, processing is performed to successively take out all the offer orders in the order table and sound the offer buzzer just once for the offer order meeting the conditions of the offer check price being less than or equal to the offer order price.

Figure 11A:
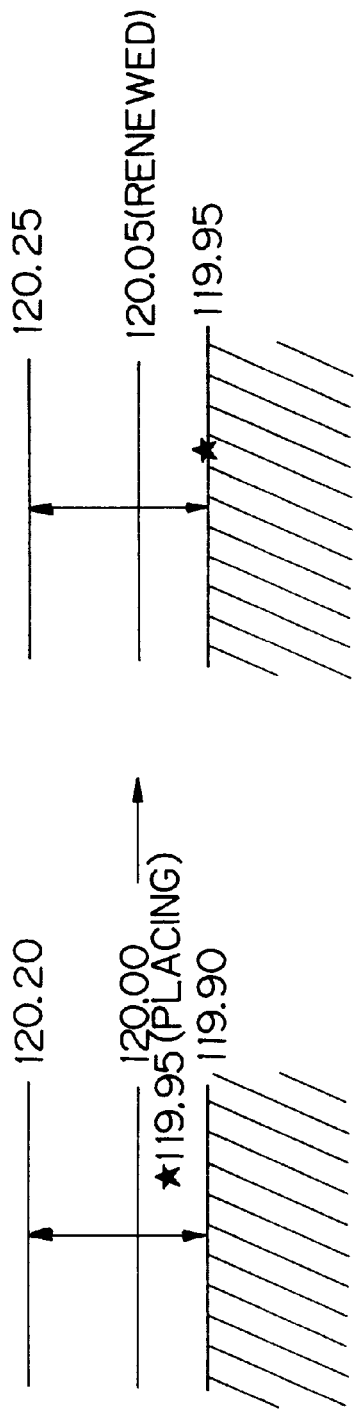
FIGS. 11A and 11B are views for explaining alarm output processing executed by the first alarm processing program.
Figure 11B:
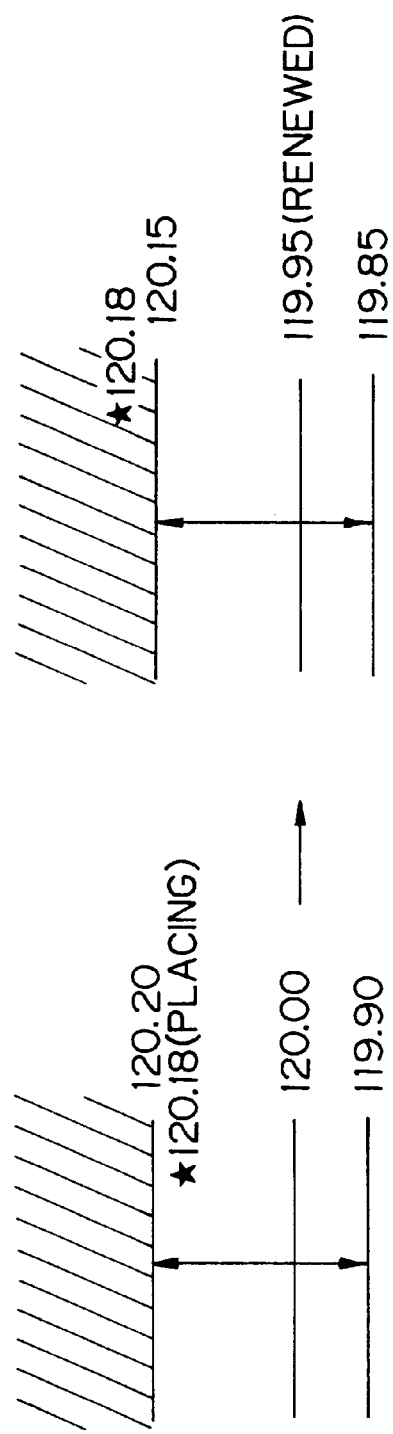

By executing the flow of processing of FIGS. 8A and 8B, the first alarm processing program 42 for example calculates the bid check price "119.90" and the offer check price "120.20" when the last trade price is "120.00", the bid margin is "10 (=0.10), and the offer margin is "20 (=0.20)", uses the bid order price zone where the condition is met of the bid check price being greater than or equal to the bid order price, as shown in FIG. 10A, as the zone for sounding the bid buzzer, uses the offer order price zone where the condition is met of the offer check price being less than or equal to the offer order price, as shown in FIG. 10B, as the zone for sounding the offer buzzer, sounds the bid buzzer just one time when the bid order price enters the bid order price zone due to the last trade price being updated, as shown in FIG. 11A, and sounds the offer buzzer just one time when the offer order price enters the offer order price zone due to the last trade price being updated, as shown in FIG. 11B.

That is, the first alarm processing program 42 operates so as to perform processing to sound the offer/bid buzzer so as to attract the attention of the customer when the disadvantageous situation arises of low availability of sellers when the bid order price becomes a low price further from the last trade price, by the bid margin (bid check price) or more, or low availability of buyers when the offer order price becomes a high price, further from the last trade price by the offer margin (offer check price) or more. Note that to enable discrimination between the offer buzzer sound and the bid buzzer sound, it is possible for example to set the offer buzzer sound low and the bid buzzer sound high or the like.

On the other hand, when given rate information from the host system 20 at two second intervals, the second alarm processing program 43 executes the flow of processing of FIGS. 9A and 9B so as to detect the advantageous situation where the possibility of a trade has become greater and to thereby sound the offer/bid buzzer.

The difference between the flow of processing of FIGS. 9A and 9B and the flow of processing of FIGS. 8A and 8B is that it is judged at step 6 (ST6) in the flow of processing of FIG. 9A whether the bid check price is less than or equal to the bid order price, while it is judged at step 6 (ST6) in the flow of processing of FIG. 8A whether the bid check price is greater than or equal to the bid order price and, also, that it is judged at step 12 (ST12) in the flow of processing of FIG. 9B whether the offer check price is greater than or equal to the offer order price while it is judged at step 12 (ST12) in the flow of processing of FIG. 8B whether the offer check price is less than or equal to the offer order price.

Figure 12A:
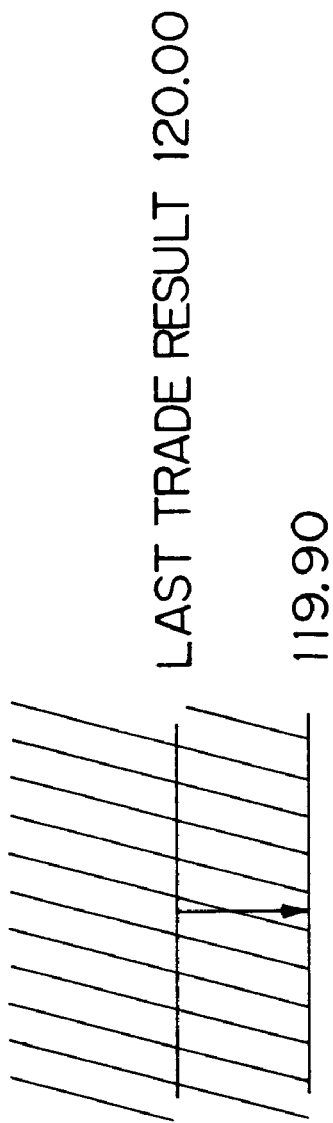
FIGS. 12A and 12B are views for explaining a buzzer sounding zone.
Figure 12B:
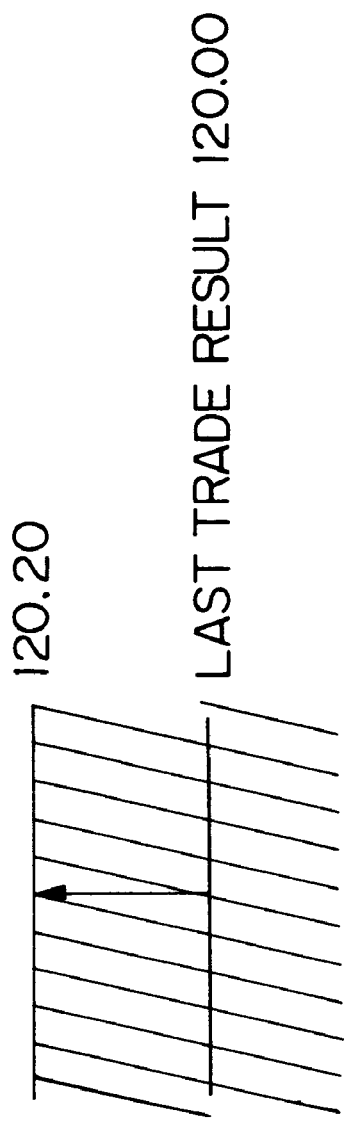
Figure 13A:
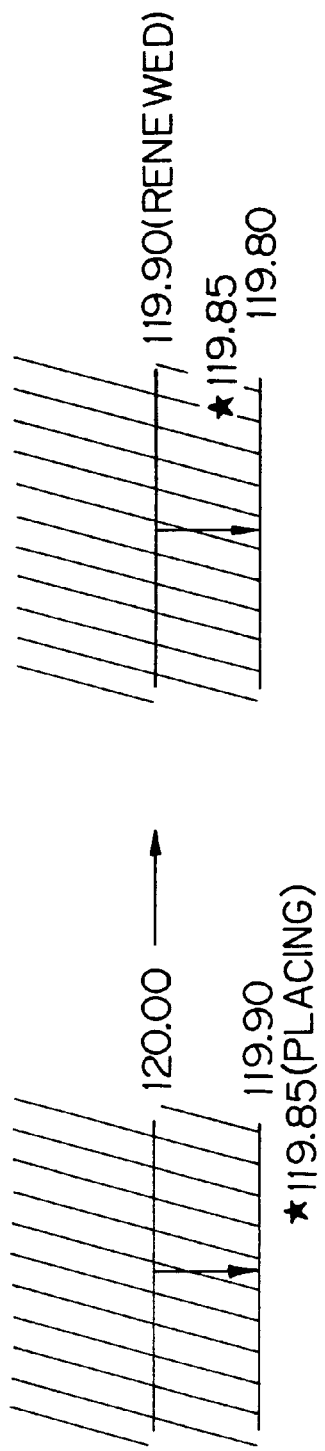
FIGS. 13A and 13B are views for explaining alarm output processing executed by a second alarm processing program.
Figure 13B:
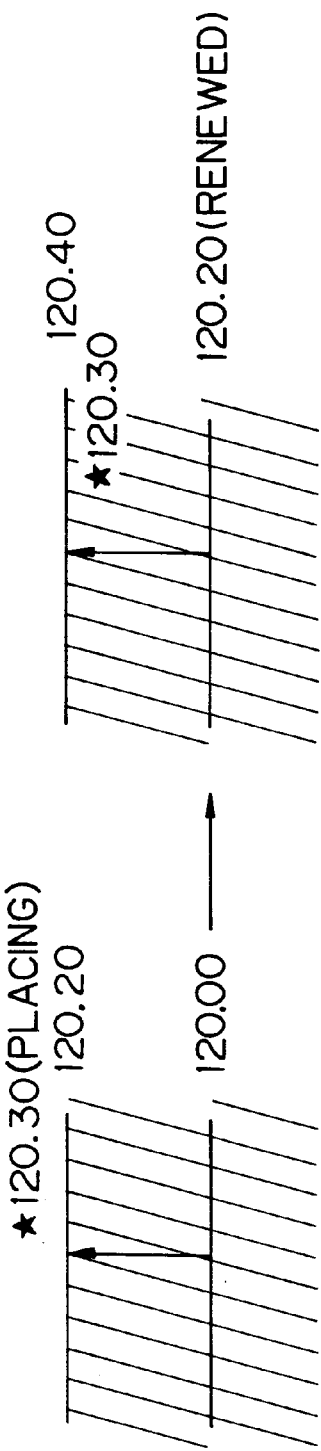

Due to these differences, by executing the flow of processing of FIGS. 9A and 9B, the second alarm processing program 43, for example, calculates the bid check price "119.90" and the offer check price "120.20" when the last trade price is "120.00", the bid margin is "10 (=0.10), and the offer margin is "20 (=0.20)", uses the bid order price zone where the condition is met of the bid check price being less than or equal to the bid order price, as shown in FIG. 12A, as the zone for sounding the bid buzzer, uses the offer order price zone where the condition is met of the offer check price being greater than or equal to the offer order price, as shown in FIG. 12B, as the zone for sounding the offer buzzer, sounds the bid buzzer just one time when the bid order price enters the bid order price zone due to the last trade price being updated, as shown in FIG. 13A, and sounds the offer buzzer just one time when the offer order price enters the offer order price zone due to the last trade price being updated, as shown in FIG. 13B.

That is, the second alarm processing program 43 operates so as to perform processing to sound the offer/bid buzzer so as to attract the attention of the customer when the advantageous situation arises of ready availability of sellers when the bid order price becomes a high price within a bid margin (bid check price) from the last trade price or ready availability of buyers when the offer order price becomes a low price within the offer margin (offer check price) from the last trade price. Here, in the buzzer sounding zone shown in FIG. 12, it is assumed that there may be a case where the last trade price is less than or equal to the bid order price or a case where the last trade price is greater than or equal to the offer order price, but in such cases trades are immediately established, so there is almost no problem with them in practice. Note that to enable discrimination between the offer buzzer sound and the bid buzzer sound, it is possible, for example, to set the offer buzzer sound low and the bid buzzer sound high or the like.

Figure 14:
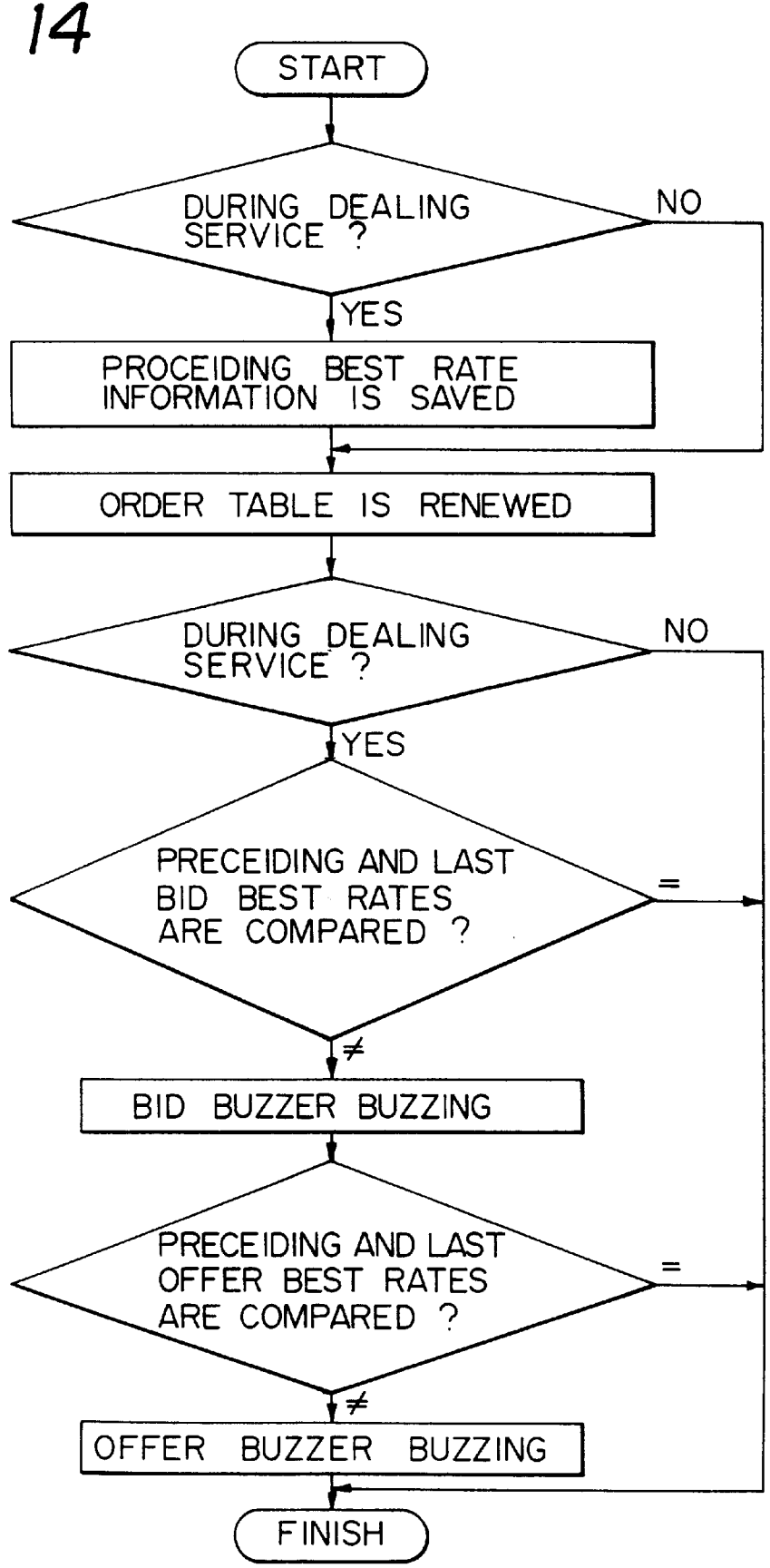
FIG. 14 is a flow chart of an example of a flow of processing executed by a third alarm processing program.
Figure 15:
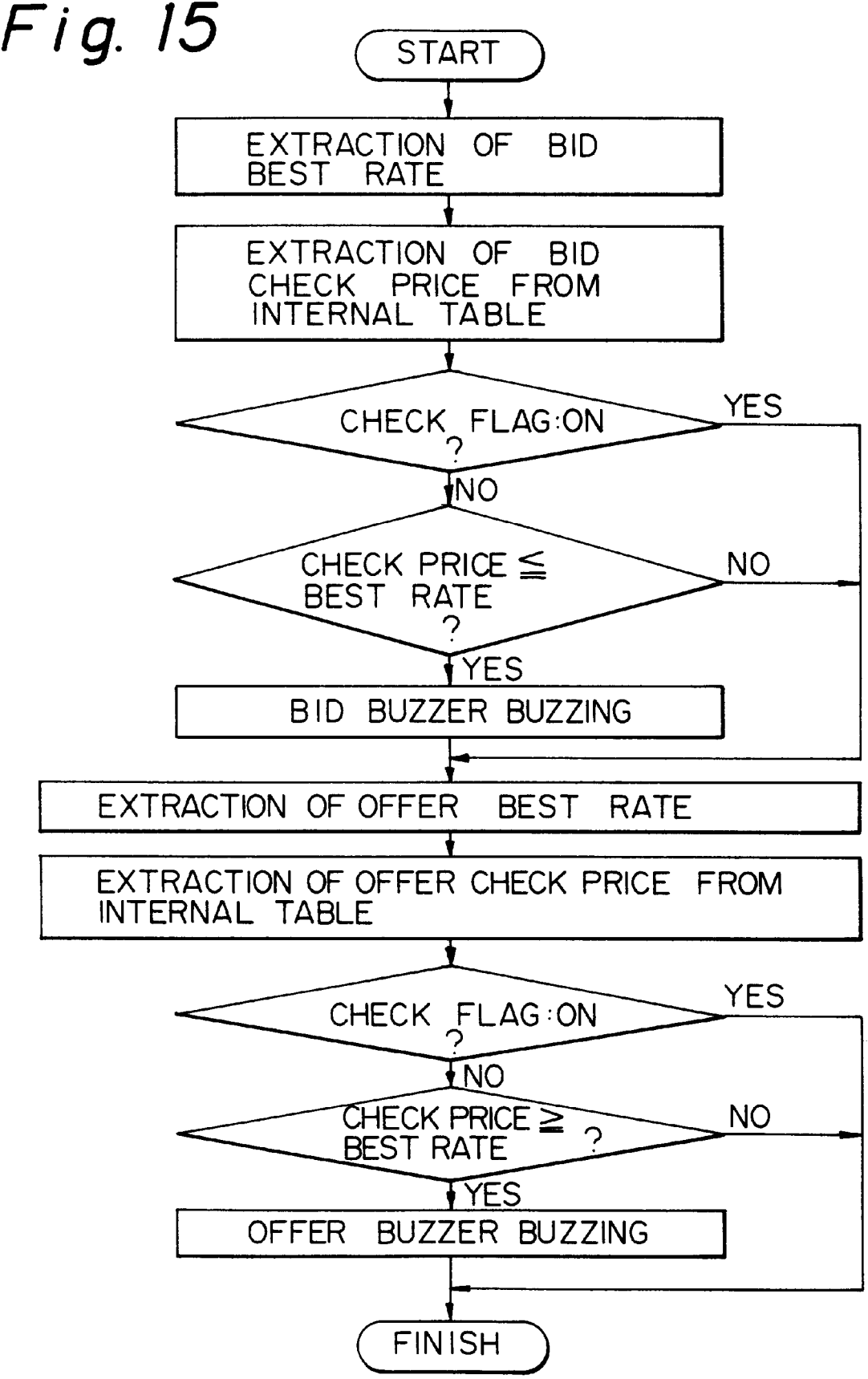
FIG. 15 is a flow chart of an example of a flow of processing executed by a fifth alarm processing program.

FIG. 14 shows an example of the flow of processing executed by the third alarm processing program 40, and FIG. 15 shows an example of the flow of processing executed by the fifth alarm processing program 44.

When notified of the best rate from the host system 20, the third alarm processing program 40, as shown in the flow of processing of FIG. 14, withdraws the best rate previously notified and compares the withdrawn best rate with the newly notified best rate to determine if the best rate has changed or not. If it has changed, it sounds the buzzer. Note that in this case, processing is performed to distinguish between updating of a best offer rate and updating of a best bid rate. To enable discrimination between the offer buzzer sound and the bid buzzer sound, it is possible, for example, to set the offer buzzer sound low and the bid buzzer sound high or the like.

On the other hand, when notified of the best offer/bid rate from the host system 20, the fifth alarm processing program 44, as shown in the flow of processing of FIG. 15, reads out the offer/bid set absolute price (check price) stored in the internal table downloaded from the subscriber control apparatuses 24 and 30 and sounds the bid buzzer, just once, when the bid set absolute price becomes lower than the best bid rate. Further, it sounds the offer buzzer, just once, when the offer set absolute price becomes higher than the best offer rate. By this processing, alarm information is output when the best rate becomes more advantageous than the set absolute price. Note that, while not shown in this flow of processing, the check flag is set to the ON mode when sounding the bid buzzer and the check flag is set to the ON mode when sounding the offer buzzer. Further, to enable the offer buzzer noise and the bid buzzer noise to be discriminated, it is possible for example to set the offer buzzer noise low and the bid buzzer noise high and the like.

In this way, the alarm processing program running in the terminals 25 and 31 performs processing to notify the state of the order placed on the market, to the customer placing the order, using a buzzer sound.

While the invention has been explained with reference to the illustrated embodiments, it is not limited to the same. For example, in the embodiments, a structure for outputting alarm information using a buzzer sound was disclosed, but the present invention is not limited to this. It is also possible to adopt a construction using synthesized speech. Further, in this embodiment, a structure was disclosed for outputting an alarm only when the alarm output conditions are first satisfied, but the invention is not limited to this. It is also possible to adopt a construction in which an alarm is output each time the alarm output conditions are satisfied.

As explained above, according to the present invention, there is provided an electronic dealing system in which the order side customer can determine the state of the orders he has placed on the market by information supplied using audio alarms. As a result,, he need no longer monitor the display screen constantly, whereby the load on the customer is lightened. Further, there is no trouble caused by overlooking the occurrence of advantageous situations and disadvantageous situations.

We claim:

1. An electronic dealing system which electronically performs matching processing between the information on transaction orders placed by order side customers and information on transaction orders placed by hit side customers so as to establish transactions, comprising:

setting means for setting a margin relative to a last trade price corresponding to a transaction order;

calculating means, connected to said setting means, for calculating a decision price for the transaction from the last trade price and the margin set by said setting means when the last trade price corresponding thereto has been determined and outputting the calculated decision price;

detecting means, connected to said calculating means, for detecting if a situation has occurred, with respect to an order placed by an order side customer, which is disadvantageous to the customer under current market conditions with respect to the price of the placed order by judging the relative amount of the price of the placed order, as placed by the order side customer, and the calculated decision price output by said calculating means, the situation comprising one of a first situation, which is disadvantageous as to a bid order price of the order placed by the order side customer, and a second situation, which is disadvantageous as to an offer order price of a bid order placed by the order side customer, further detecting if a best rate has changed and outputs a corresponding best rate change detection output, and furthermore detecting if an order, which has been placed, is hit and outputs a corresponding hit detection output; and alarm means, interior of said system, for selectively outputting different audio alarms when the detecting means detects, respectively, the occurrence of the first and second disadvantageous situations enabling the customer to discriminate between the first and second situations, further being responsive to the best rate change detection output for producing a corresponding audio alarm output, and furthermore being responsive to the hit detection output, produced by the detecting means when detecting a hit, for outputting a corresponding alarm output.

2. An electronic dealing system as set forth in claim 1, wherein said alarm comprises synthesized speech.

3. An electronic dealing system as set forth in claim 1, wherein said alarm comprises synthesized speech.

4. An electronic dealing system as set forth in claim 1, wherein said alarm means is responsive only to a first detection output of said detecting means of a first occurrence of the disadvantageous situation.

5. An electronic dealing system as set forth in claim 1, wherein said alarm means is responsive only to the first detection output corresponding to the first occurrence of the first situation and to the further, first detection output corresponding to the first occurrence of the second situation for producing the respective audio alarms.

6. An electronic dealing system which electronically performs matching processing between the information on transaction orders placed by order side customers and information on transaction orders placed by hit side customers so as to establish transactions, comprising:

setting means for setting a margin relative to a last trade price corresponding to a transaction order;

calculating means, connected to said setting means, for calculating a decision price for the transaction from the last trade price corresponding thereto and the margin set by said setting means when the last trade price has been determined and outputting the calculated decision price;

detecting means, connected to said calculating means, for detecting if a situation has occurred, with respect to an order placed by an order side customer, which is advantageous to the customer under current market conditions with respect to the price of the offered order by judging the relative amount of the price of the offered order, as placed by the order side customer, and the calculated decision price output by said calculating means, and the situation comprising one of a first situation, which is advantageous as to a bid order price of the order placed by the order side customer and of a second situation, which is advantageous as to an offer order price of a bid order placed by the order side customer, further detecting if a best rate has changed and outputs a corresponding best rate change detection output, and furthermore detecting if an order, which has been placed, is hit and outputs a corresponding hit detection output; and alarm means, interior of said system, for selectively outputting different audio alarms when the detecting means detects, respectively, the occurrence of the first and second advantageous situations enabling the customer to discriminate between the first and second situations, further being responsive to the best rate change detection output for producing a corresponding audio alarm output, and furthermore being responsive to the hit detection output, produced by the detecting means when detecting a hit, for outputting a corresponding alarm output.

7. An electronic dealing system as set forth in claim 6, wherein said alarm comprises synthesized speech.

8. An electronic dealing system as set forth in claim 6, wherein said alarm comprises synthesized speech.

9. An electronic dealing system as set forth in claim 6, wherein said alarm means is responsive only to a first detection output of said detecting means of a first occurrence of the advantageous situation.

10. An electronic dealing system as set forth in claim 6, wherein said alarm means is responsive only to the first detection output, corresponding to the first occurrence of the first situation and to the further, first detection output corresponding to the first occurrence of the second situation for producing the respective audio alarm.

11. An electronic dealing system which electronically performs matching processing between information on transaction orders placed by order side customers and information on transaction orders placed by hit side customers so as to establish transactions therebetween, comprising:

trade price monitoring and determining means for monitoring trade prices and for determining a last trade price relative to a specific transaction;

setting means for setting a margin relative to the last trade price;

calculating means, connected to said setting means and said trade price monitoring and determining means, for calculating a decision price for the specific transaction from the last trade price relative thereto and the margin set by said setting means when the last trade price has been determined by said trade price monitoring and determining means and outputting the calculated decision price;

detecting means, connected to said calculating means, for detecting if a situation has occurred, with respect to an order placed by an order side customer which is disadvantageous to the customer under current market conditions with respect to the price of the placed order by judging the relative amount of the price of the placed order, as placed by the order side customer, and the calculated decision price output by said calculating means, and the situation comprising one of a first situation, which is disadvantageous as to a bid order price of the order placed by the order side customer and a second situation, which is disadvantageous as to an offer order price of a bid order placed by the order side customer, further detecting if a best rate has changed and outputs a corresponding best rate change detection output, and furthermore detecting if an order, which has been placed, is hit and outputs a corresponding hit detection output; and alarm means, interior of said system, for selectively outputting different audio alarms when the detecting means detects, respectively, the occurrence of the first and second disadvantageous situations enabling the customer to discriminate between the first and second situations, further being responsive to the best rate change detection output for producing a corresponding audio alarm output, and furthermore being responsive to the hit detection output, produced by the detecting means when detecting a hit, for outputting a corresponding alarm output.

12. An electronic dealing system which electronically performs matching processing between information on transaction orders placed by order side customers and information on transaction orders placed by hit side customers so as to establish transactions therebetween, comprising:

trade price monitoring and determining means for monitoring trade prices and for determining a last trade price relative to a specific transaction;

setting means for setting a margin relative to the last trade price;

calculating means, connected to said setting means and said trade price monitoring and determining means, for calculating a decision price for the specific transaction from the last trade price relative thereto and the margin set by said setting means when the last trade price has been determined by said trade price monitoring and determining means and outputting the calculated decision price;

detecting means, connected to said calculating means, for detecting if a situation has occurred, with respect to an order placed by an order side customer which is advantageous to the customer under current market conditions with respect to the price of the offered order by judging the relative amount of the price of the offered order, as placed by the order side customer, and the calculated decision price output by said calculating means, and the situation comprising one of a first situation, which is advantageous as to a bid order price of the order placed by the order side customer and a second situation, which is advantageous as to an offer order price of a bid order placed by the order side customer, further detecting if a best rate has changed and outputs a corresponding best rate change detection output, and furthermore detecting if an order, which has been placed, is hit and outputs a corresponding hit detection output; and alarm means, interior of said system, for selectively outputting different audio alarms when the detecting means detects, respectively, the occurrence of the first and second advantageous situation enabling the customer to discriminate between the first and second situations, further being responsive to the best rate change detection output for producing a corresponding audio alarm output, and furthermore being responsive to the hit detection output, produced by the detecting means when detecting a hit, for outputting a corresponding alarm output.

13. An electronic dealing system comprising:

a host computer;

plural customer systems individually connected to the host computer and by the host computer selectively to other said customer systems, each customer system comprising a terminal which is interactive with the customer;

each terminal being operative to generate and supply, to the host computer, information on an offer of order transaction order placed by an order side customer and information on a request for hit transaction order placed by a hit side customer;

the host system further comprising:
 an administration unit for receiving an offer of order information from a terminal and for receiving a request for hit information from a terminal, and
 a matching unit for matching an order placed by an order side customer with a request for hit placed by a hit side customer, as received by the host computer respectively from the corresponding order side customer and hit side customer terminals, and for completing a transaction therebetween; and each terminal further comprising:
 setting means for setting a margin relative to a last trade price corresponding to a transaction order,
 calculating means, connected to said setting means, for calculating a decision price for the transaction from the last trade price and the margin set by said setting means when the last trade price corresponding thereto has been determined and outputting the calculated decision price,
 detecting means, connected to said calculating means, for detecting if a situation has occurred, with respect to an order placed by an order side customer, which is one of a disadvantageous situation and an advantageous situation to the customer under current market conditions with respect to the price of the placed order by judging the relative amount of the price of the placed order, as placed by the order side customer, and the calculated decision price output by said calculating means, further detecting if a best rate has changed and outputs a corresponding best rate change detection output, and furthermore detecting if an order, which has been placed, is hit and outputs a corresponding hit detection output; and alarm means, disposed interior said terminal connected to said detecting means and responsive to the detecting means detecting the occurrence of one of the advantageous situation and the disadvantageous situation, for producing a corresponding one of advantageous and disadvantageous different audio alarm outputs, further being responsive to the best rate change detection output for producing a corresponding audio alarm output, and furthermore being responsive to the hit detection output, produced by the detecting means when detecting a hit, for outputting a corresponding alarm output.

14. An electronic dealing system as claimed in claim 13, wherein said alarm means ouputs a different alarm for a plurality of disadvantageous situations and for a plurality of advantageous situations.

15. An electronic dealing system comprising:

a host computer;

plural customer systems individually connected to the host computer and by the host computer selectively to other said customer systems, each customer system comprising a terminal which is interactive with a customer;

each terminal being operative to generate and supply, to the host computer, information on an offer of order transaction order placed by an order side customer and information on a request for hit transaction order placed by a hit side customer;

the host system comprising:
 an administration unit for receiving an offer of order information from a terminal and for receiving a request for hit information from a terminal, and
 a matching unit for matching an order placed by an order side customer with a request for hit placed by a hit side customer, as received by the host computer respectively from the corresponding order side customer and hit side customer terminals, and for completing a transaction therebetween; and each terminal further comprising:
 trade price monitoring and determining means for monitoring trade prices and for determining a last trade price relative to a specific transaction;
 setting means for setting a margin relative to the last trade price;
 calculating means, connected to said setting means and said trade price monitoring and determining means, for calculating a decision price for the specific transaction from the last trade price relative thereto and the margin set by said setting means when the last trade price has been determined by said trade price monitoring and determining means and outputting the calculated decision price;
 detecting means, connected to said calculating means, for detecting if a situation has occurred, with respect to an order placed by an order side customer which is one of a disadvantageous situation and an advantageous situation to the customer under current market conditions with respect to the price of the placed order by judging the relative amount of the price of the placed order, as placed by the order side customer, and the calculated decision price output by said calculating means, further detecting if a best rate has changed and outputs a corresponding best rate change detection output, and furthermore detecting if an order, which has been placed, is hit and outputs a corresponding hit detection output; and alarm means, disposed interior of said terminal connected to said detecting means and responsive to the detecting means detecting the occurrence of one of the advantageous situation and the disadvantageous situation, for producing a corresponding one of advantageous and disadvantageous different audio alarm outputs, further being responsive to the best rate change detection output for producing a corresponding audio alarm output, and furthermore being responsive to the hit detection output, produced by the detecting means when detecting a hit, for outputting a corresponding alarm output.

16. An electronic dealing system as claimed in claim 15, wherein said alarm means ouputs a different alarm for a plurality of disadvantageous situations and for a plurality of advantageous situations.

* * * * *